(12) United States Patent
Galstian

(10) Patent No.: US 8,542,333 B2
(45) Date of Patent: Sep. 24, 2013

(54) LIQUID CRYSTAL CELL ALIGNMENT SURFACE PROGRAMMING METHOD AND LIQUID CELL LIGHT MODULATOR DEVICES MADE THEREOF

(75) Inventor: Tigran Galstian, Quebec (CA)

(73) Assignee: Universite Laval, Quebec (CA)

( * ) Notice: Subject to any disclaimer, the term of this patent is extended or adjusted under 35 U.S.C. 154(b) by 334 days.

(21) Appl. No.: 13/054,224

(22) PCT Filed: Jul. 14, 2009

(86) PCT No.: PCT/CA2009/000951
§ 371 (c)(1),
(2), (4) Date: Jan. 14, 2011

(87) PCT Pub. No.: WO2010/006419
PCT Pub. Date: Jan. 21, 2010

(65) Prior Publication Data
US 2011/0116020 A1     May 19, 2011

Related U.S. Application Data

(60) Provisional application No. 61/080,489, filed on Jul. 14, 2008.

(51) Int. Cl.
*G02F 1/1333*     (2006.01)
(52) U.S. Cl.
USPC .......................................................... 349/84
(58) Field of Classification Search
USPC ................. 349/129, 158, 176, 191, 194, 200,
349/88, 93, 94; 438/30, 31, 32, 98, 151;
257/E21.585, E21.586, 151, 338, 585, 586
See application file for complete search history.

(56) References Cited

U.S. PATENT DOCUMENTS

| 3,954,325 | A | * | 5/1976 | Borden | 349/158 |
| 4,892,392 | A | | 1/1990 | Broer | |
| 6,133,980 | A | * | 10/2000 | Faris | 349/176 |
| 6,888,612 | B2 | * | 5/2005 | Faris | 349/194 |
| 7,218,375 | B2 | | 5/2007 | Galstian et al. | |
| 7,749,783 | B2 | * | 7/2010 | Yang et al. | 438/30 |
| 8,045,099 | B2 | * | 10/2011 | Tashiro et al. | 349/88 |
| 2003/0138982 | A1 | | 7/2003 | Wei et al. | |
| 2005/0062920 | A1 | * | 3/2005 | Chaudhari et al. | 349/129 |
| 2006/0082719 | A1 | | 4/2006 | Okabe et al. | |
| 2006/0083865 | A1 | | 4/2006 | Okabe et al. | |

(Continued)

FOREIGN PATENT DOCUMENTS

| EP | 0261712 A1 | 3/1988 |
| JP | 2006-234885 A | 9/2006 |

(Continued)

OTHER PUBLICATIONS

Hayashi, K. et al., "Monodomain alignment of liquid crystals without rubbing treatment III: Chemical structure and alignment" [in Japanese], Preprints of Symposium on Liquid Crystals, Japanese Liquid Crystal Society, vol. 21, pp. 350-351.

(Continued)

*Primary Examiner* — Akm Enayet Ullah
(74) *Attorney, Agent, or Firm* — Anglehart et al.

(57) ABSTRACT

A liquid crystal display or other light modulator is provide with an alignment layer with a pretilt that is better than is currently available with rubbing technology. The liquid crystal cell consumes less electrical power to operate. The pretilt can be programmed using suitable field and recorded in the alignment layer.

22 Claims, 13 Drawing Sheets

(56) References Cited

U.S. PATENT DOCUMENTS

| | | |
|---|---|---|
| 2007/0146910 A1 | 6/2007 | Duston et al. |
| 2008/0151145 A1 | 6/2008 | Kumazawa et al. |
| 2009/0033834 A1 | 2/2009 | Kuroda |
| 2009/0284827 A1 | 11/2009 | Verstegen |
| 2010/0302489 A1 | 12/2010 | Kuroda |

FOREIGN PATENT DOCUMENTS

| | | |
|---|---|---|
| JP | 2006-284651 A | 10/2006 |
| JP | 2008-191655 A | 8/2008 |
| KR | 10-2008-0056890 A | 6/2008 |
| KR | 10-2008-0065547 A | 7/2008 |
| WO | WO 2006/072863 A1 | 7/2006 |
| WO | WO 2006/088101 A1 | 8/2006 |

OTHER PUBLICATIONS

International Preliminary report of PCT/CA2009/000951.
International search report of PCT/CA2009/000951.
Written opinion of PCT/CA2009/000951.

\* cited by examiner

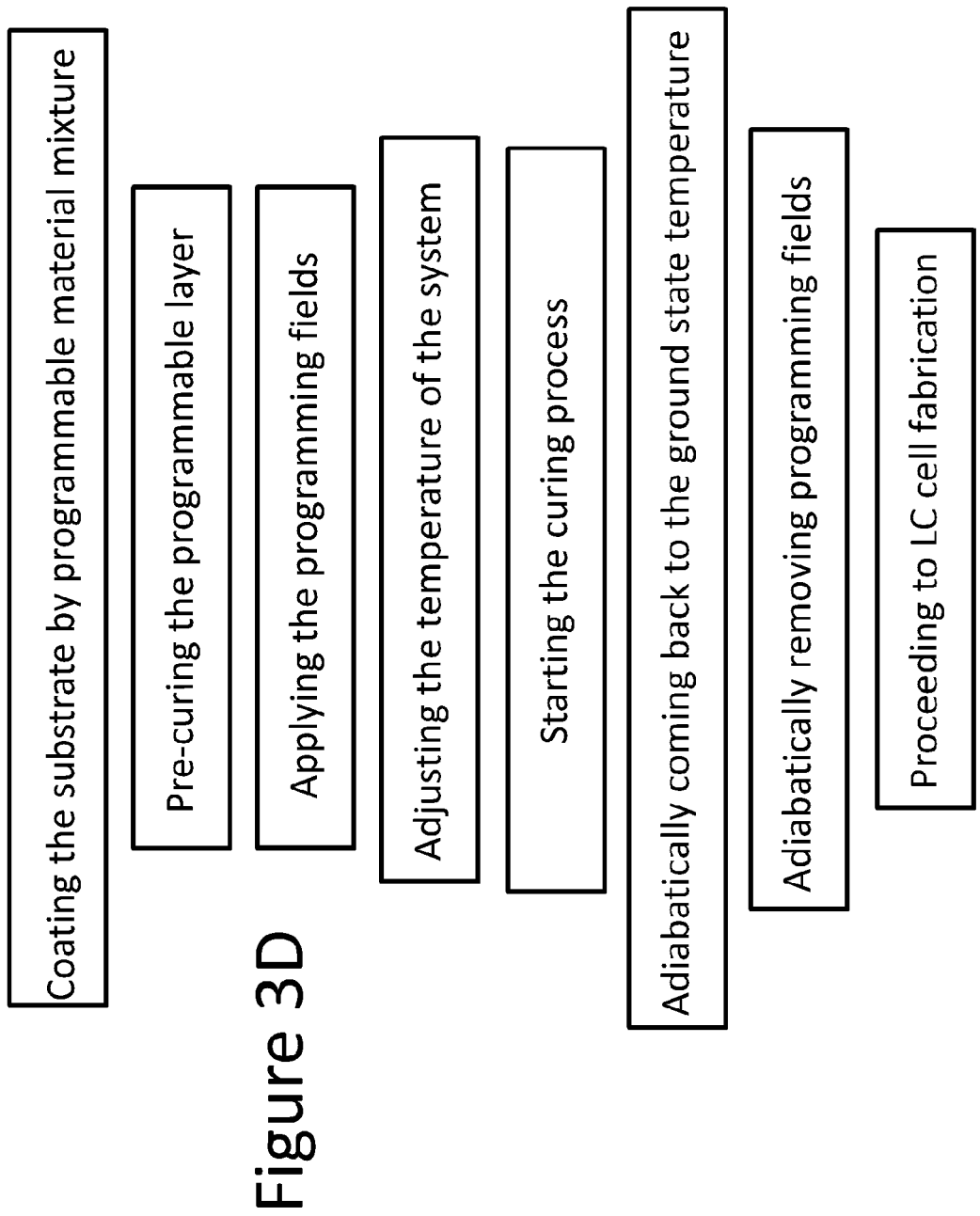

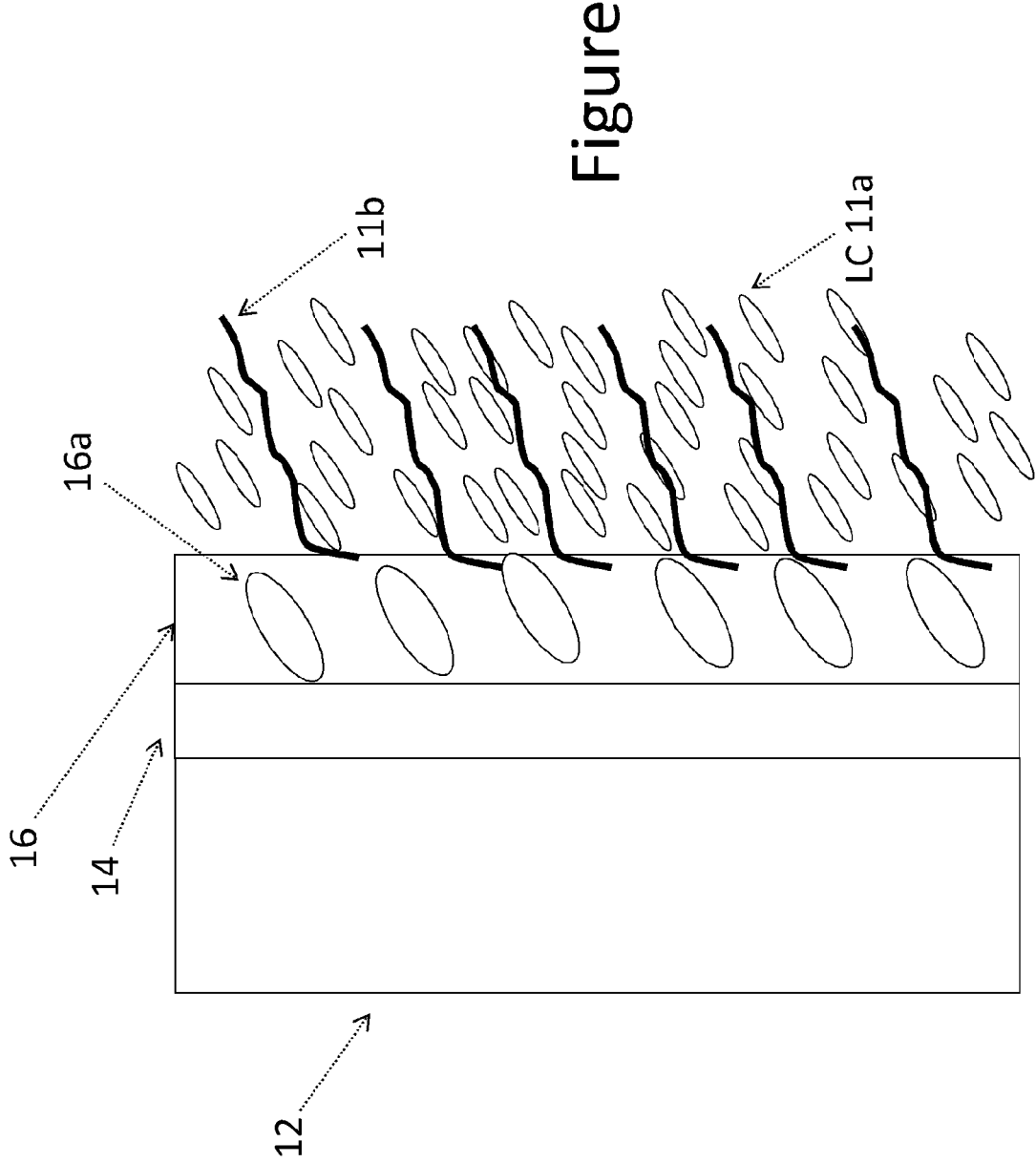

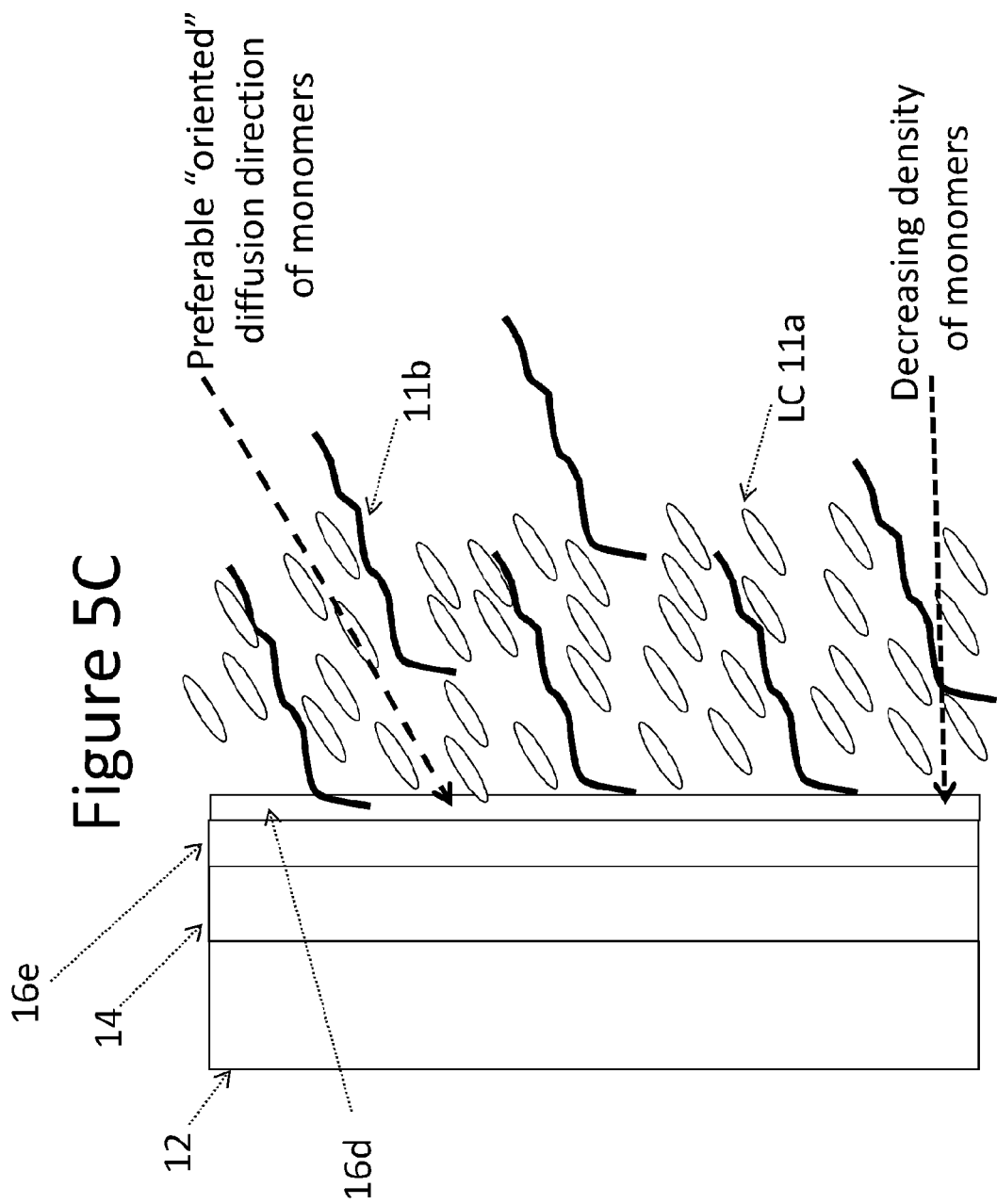

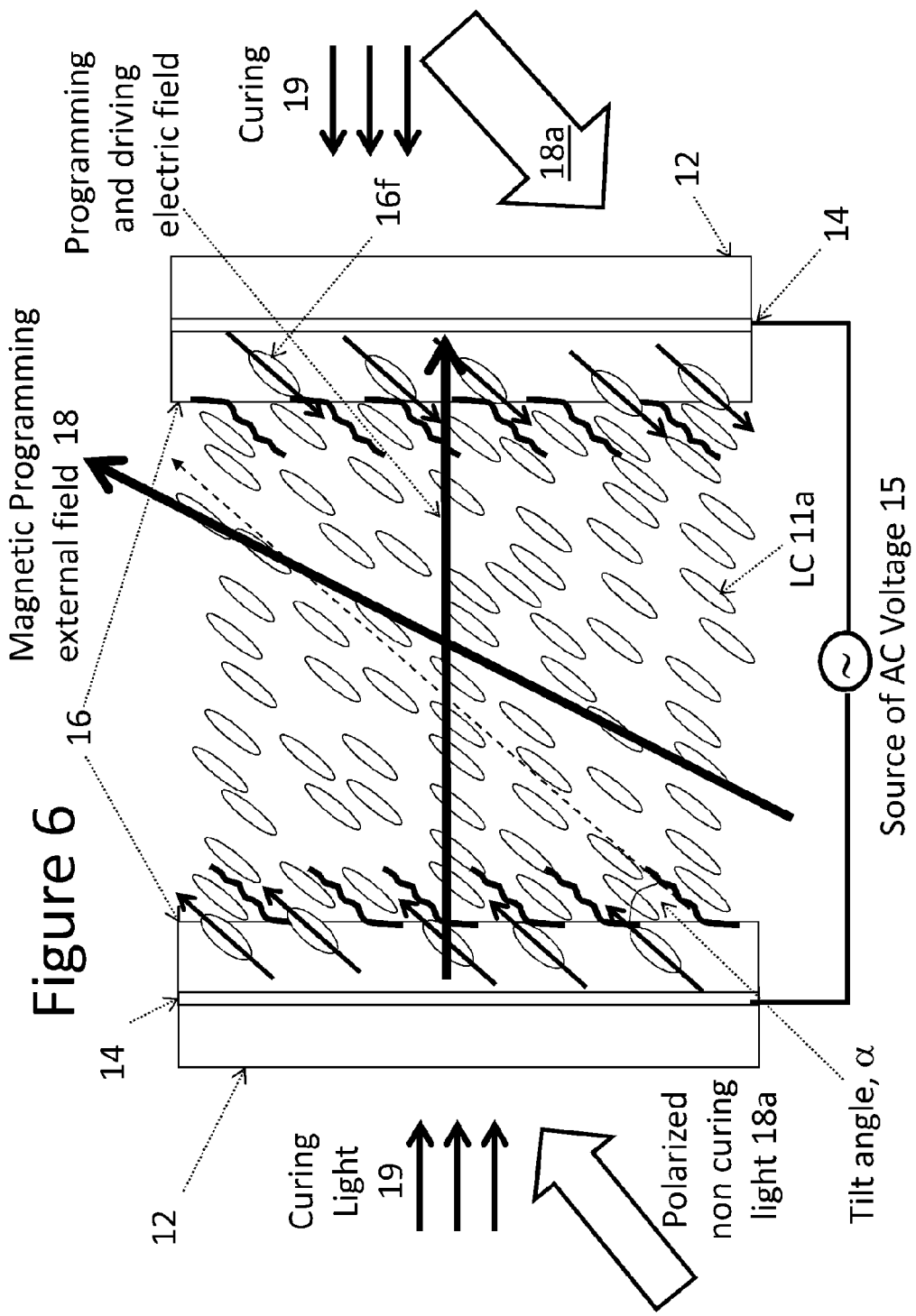

LIQUID CRYSTAL CELL ALIGNMENT SURFACE PROGRAMMING METHOD AND LIQUID CELL LIGHT MODULATOR DEVICES MADE THEREOF

TECHNICAL FIELD

The present invention relates to manufacturing methods for liquid crystal (LC) electro-optic device applications such as displays and other light modulators.

BACKGROUND OF THE INVENTION

LC devices are based on the alignment of LC molecules on substrates that are sandwiched together to form the LC cell. The interaction of LC with the surface of the substrate is of paramount importance for several reasons. Among the most important ones are A—the necessity to have a returning force (to enable the "free" relaxation) and B—to provide a pretilt angle to trigger a uniform reorientation direction.

The traditional way of achieving the desired alignment of LC molecules was (and still is) the mechanical rubbing of the surface of the substrate [T. Ito and K. Nakanishi. Regularity and narrowness of the intervals of the microgrooves on the rubbed polymer surfaces for LC alignment. In SID International Symposium Digest of Technical Papers, Vol XXIII, pages 393-396, Boston, Mass., USA, May 1992. SID.]. While the substrate itself may be processed in this way to achieve LC alignment, very often, specific alignment layers are first coated on the inner surface of the substrate (carrying already a transparent conductive layer, such as indium tin oxide or ITO), which are then rubbed, FIG. 1 (Prior art). A classical example of such layer is the polyimide polymer family. As it can be easily imagined, the rubbing process is not reliable and may damage the cell and create non uniformities and dust. That is why intensive efforts are devoted to develop non-contact alignment methods of LC alignment. Among others, we should note the photo alignment [Gibbons; Wayne M., Sun; Shao-Tang, Swetlin; Brian J. "Process of aligning and realigning liquid crystal media," U.S. Pat. No. 4,974,941, Dec. 4, 1990; Chigrinov; Vladimir G., Kozenkov; Vladimir M., Novoseletsky; Nicolic V., Reshetnyak; Victor Y., Reznikov; Yuriy A., Schadt; Martin, Schmitt; Klaus, "Process for making photopolymers having varying molecular orientation using light to orient and polymerize", U.S. Pat. No. 5,389,698, Feb. 14, 1995] and vacuum deposition (e.g., SiOx, [Kyung Chan Kim, Han Jin Ahn, Jong Bok Kim, Byoung Har Hwang, Hong Koo Baik, Novel Alignment Mechanism of Liquid Crystal on a Hydrogenated Amorphous Silicon Oxide, Langmuir 2005, 21, 11079-11084]). Both approaches are progressing rather rapidly and there are even few companies, which have already announced their use in commercial products (for example, for Projecting Displays using Vertical Aligned LC). However those techniques must be approved yet for large scale, cost effective and reliable manufacturing processes.

So called, polymer-stabilized liquid crystals (PSLC) have been used to "program" the alignment and the reorientation of LC molecules, with (e.g., an electric field) or without the use of external excitation means for that programming [T. Galstian, V. Presniakov, A. Tork, K. Asatryan, Electrically variable focus polymer-stabilized liquid crystal lens, U.S. Pat. No. 7,218,375, May 15, 2007]. However, the material system and the programming method used there did not allow the creation of "programmed surfaces" but let the created polymer network to "float" in the volume of the cell, FIG. 2 (Prior art). This reduces the stability of the structures obtained and also creates volume aggregation of polymer and light scattering on director (average orientation of long molecular axes) orientation defects formed around those aggregations [V. V. Presnyakov; T. V. Galstian, Light Polarizer Based on Anisotropic Nematic Gel with Electrically Controlled Anisotropy of Scattering, Molecular Crystals and Liquid Crystals, Volume 413, Issue 1, 2004, pages 545-551].

A further approach to creating an alignment layer with a desired pre-tilt angle involves using a dual polymer composition having vertical and horizontal components that are then baked or rubbed to achieve different uniform pre-tilt angles. See for example the article by Karen E. Vaughn, Matthew Sousa, Daeseung Kang, and Charles Rosenblatt, "Continuous control of liquid crystal pretilt angle from homeotropic to planar", APPLIED PHYSICS LETTERS 90, pp. 194102 194102-1, 2007, and the article by Fion S. Yeung, Jacob Y. Ho, Y. W. Li, F. C. Xie, Ophelia K. Tsui, P. Sheng, and H. S. Kwoka, "Variable liquid crystal pretilt angles by nanostructured surfaces", APPLIED PHYSICS LETTERS 88, pp. 051910-1-051910-3, 2006.

In the known art, pretilt angles are typically between 1 to 6 degrees from the planar surface of the alignment layer. Since the electric field acts on the dipole of the LC molecules, the torque on the LC molecules below 6 degrees is quite weak. This torque becomes greater when the molecules begin to show a greater angle. Thus a LC cell with a 4 degree pretilt can respond better to the control field than a cell with a 1 degree pretilt, and typically consume less electrical power.

SUMMARY OF THE INVENTION

It is an object of the invention to provide an alignment layer with a pretilt that is better than is currently available with rubbing technology, and thus provides a cell that consumes less electrical power to operate. The pretilt can be programmed using suitable field and recorded in the alignment layer. With the present invention, pretilt angles between 6 and 30 degrees can be provided. Since the index of refraction changes with orientation, some loss of optical control is lost if the pre-tilt is too great in some applications. The range of 8 to 16 degrees is particularly energy efficient without sacrificing too great of optical control.

In some embodiments of the present invention, I propose new methods of non contact (rubbing free) LC alignment using optical, acoustic, electric or magnetic torque and simultaneous curing of the alignment layer, for example an partially inter-diffused polymer-liquid crystal material system, which is however stabilized by the surface of the cell. Excitation geometries and methods are disclosed that allow the rubbing-free alignment of LC molecules in different uniform structures and with desired out-of-plane pretilt programming. Several applications and devices are described that would benefit from the use of those methods.

In this specification, the term "light modulator" is intended to mean a display or other type of light modulator that does not have as its primary function image focusing lens or beam steering.

In this specification, the term "ordered surface layer formed with molecules aligned using a programming field without mechanical rubbing" is used to mean a surface layer that is formed using molecules that are aligned by light, acoustic waves, an electric field, a magnetic field, or any other suitable field able to cause an ordering in alignment of molecules that are then stabilized to provide an alignment surface for the liquid crystal cell. While a precursor or foundation substrate may be initially rubbed, the formation of the ordered surface layer is done without rubbing or use of directional vacuum deposition.

The alignment layer may be formed by alignment of molecules already present on a layer using the alignment field, or by bringing onto a substrate molecules, from a surrounding liquid medium, aligned by the alignment field and stabilizing those molecules to form the ordered layer surface. The alignment field can be an external source acting on its own or a combination of an external field and the liquid crystal cell's own control field.

The alignment layer is typically planar, however, in segmented or pixel displays, it is known to have multiple liquid crystal cells on a common substrate that has a common alignment surface, namely a rubbed surface. Divider structures between the pixel cells may be deposited on the alignment layer. In the present invention, the formation of the alignment layer can provide planar cell surfaces with raised cell dividers. It is also known in bistable displays to have a surface that has microstructures on the cell walls.

BRIEF DESCRIPTION OF THE DRAWINGS

The invention will be better understood by way of the following detailed description of embodiments with reference to the appended drawings, in which:

FIG. 3D illustrates the process flow steps for fabrication of an oriented LC cell with surface polymer stabilized (optionally inter diffused) liquid crystal, in which the programming of the surface is however done here without the LC in the cell.

FIG. 5A illustrates schematically an enlarged side sectional view of the alignment surface area showing an enhancement of the programming efficiency by incorporation of anisotropic "guest" species, such as molecules, micro and nano particles and tubes (or planes) in the surface programmable ("host") layer that is optionally inter diffused with liquid crystal (already programmed state is shown).

FIG. 5C illustrates schematically an enlarged side sectional view of the alignment surface area showing surface programming by the initiation of the polymerization process via the deposition of a thin layer of an initiator (photo, thermal, or other types).

FIG. 6 is a schematic side view of an embodiment in which the programmable alignment layer coating is doped by photo anisotropic materials (reorientable by the action of the polarization of light). demonstration of a possible geometry of surface programming using the combined effect of external field and light, in a programmable material system where;

DETAILED DESCRIPTION OF THE PREFERRED EMBODIMENT

Figure 3A:
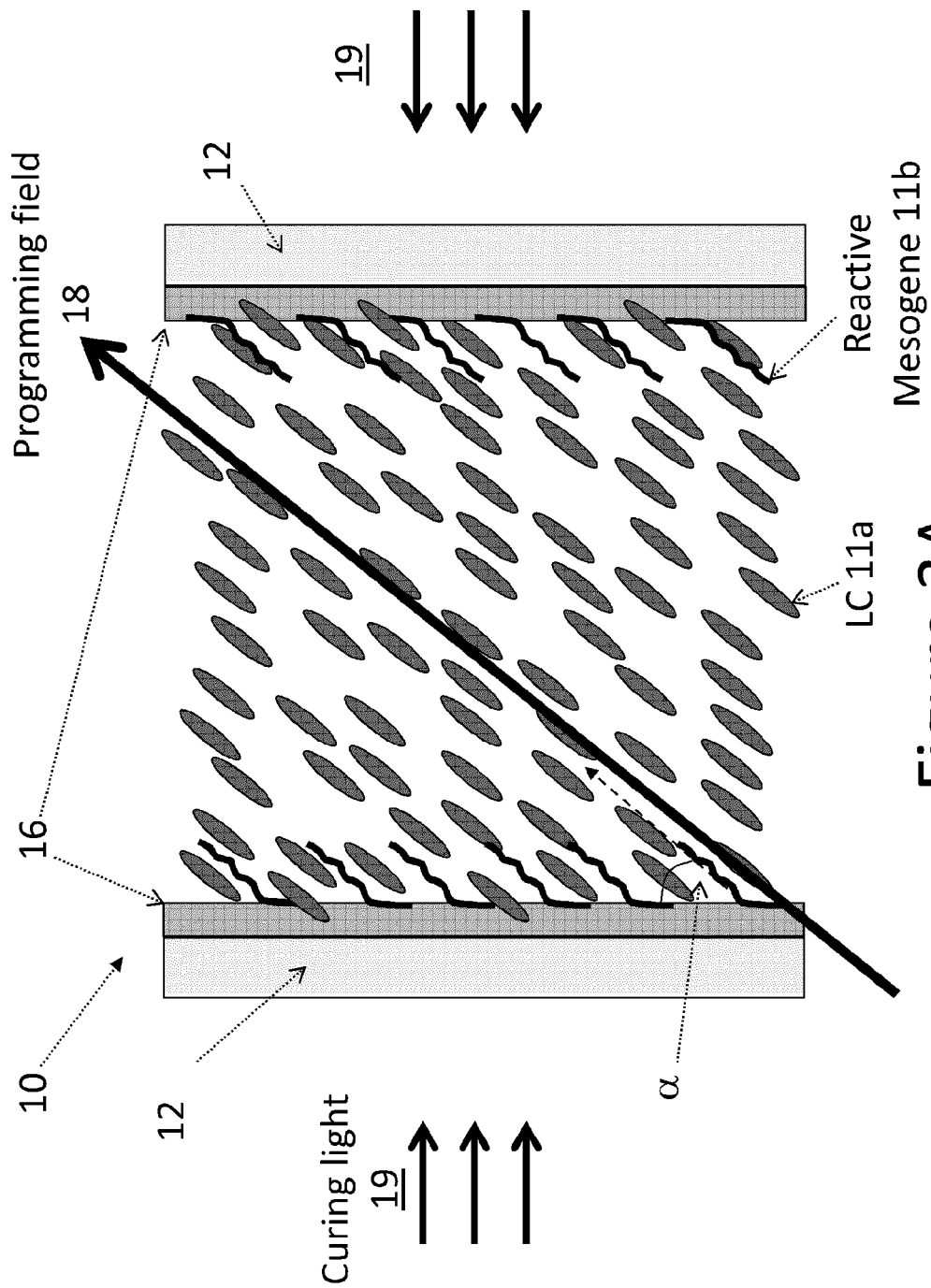
FIG. 3A is a schematic side view of one programming method to achieve an essentially uniformly oriented (at a desired pretilt angle, $\alpha_0$) LC cell filled with surface polymer stabilized (optionally inter diffused) liquid crystal using simultaneous excitation (by electric and magnetic fields), orienting (in general, at a spatially varying angle $\alpha$, or on a non-planar cell geometry) and curing (fixation).
Figure 3B:
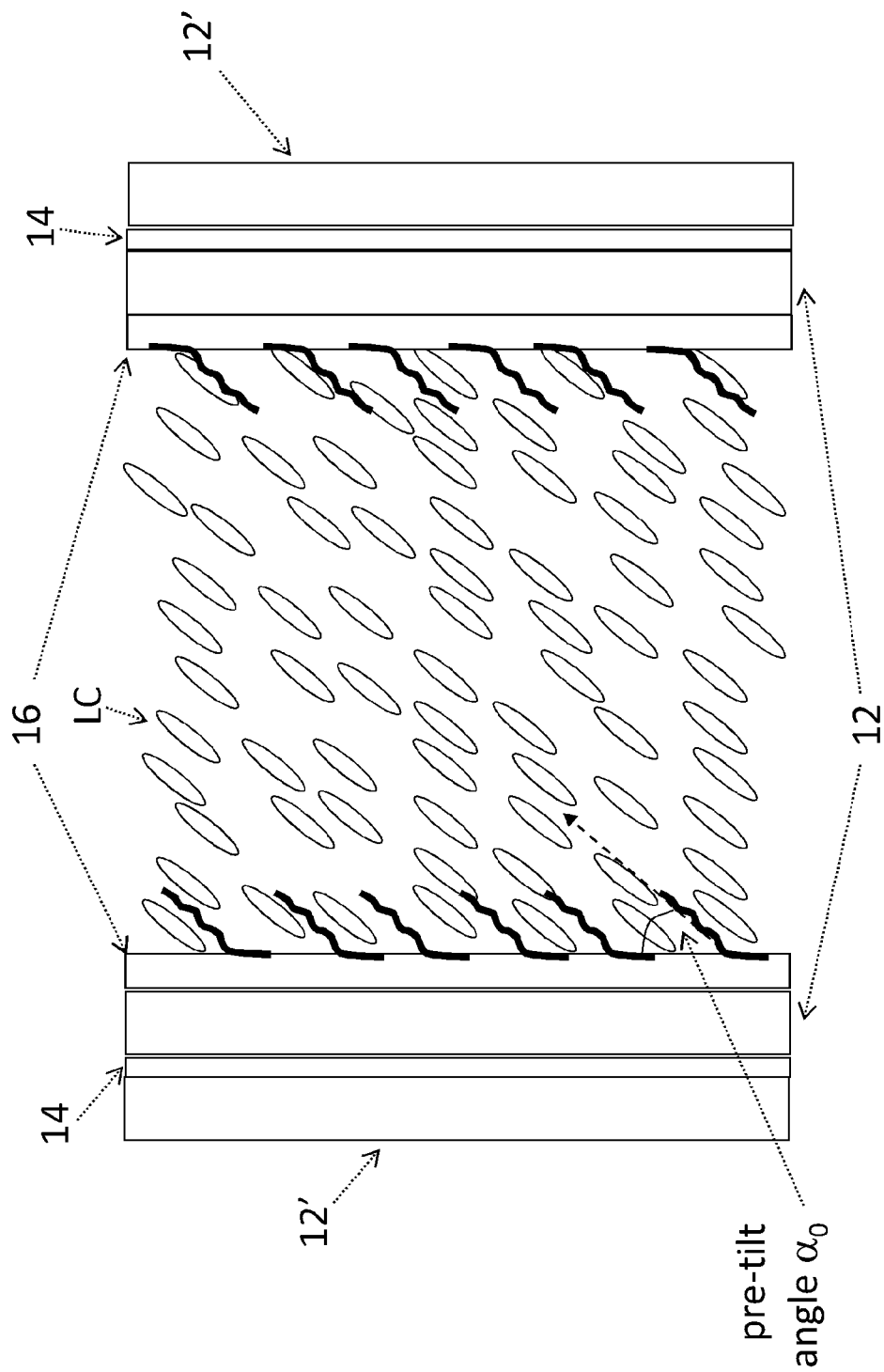
FIG. 3B illustrates schematically a side view of the "final" oriented LC cell filled with surface polymer stabilized (optionally inter diffused) liquid crystal in the ground state (after programming, no excitation), and transparent electrodes (alone or with additional substrates) added to the initial cell from both sides to enable the electrical control of the obtained cell.
Figure 3C:
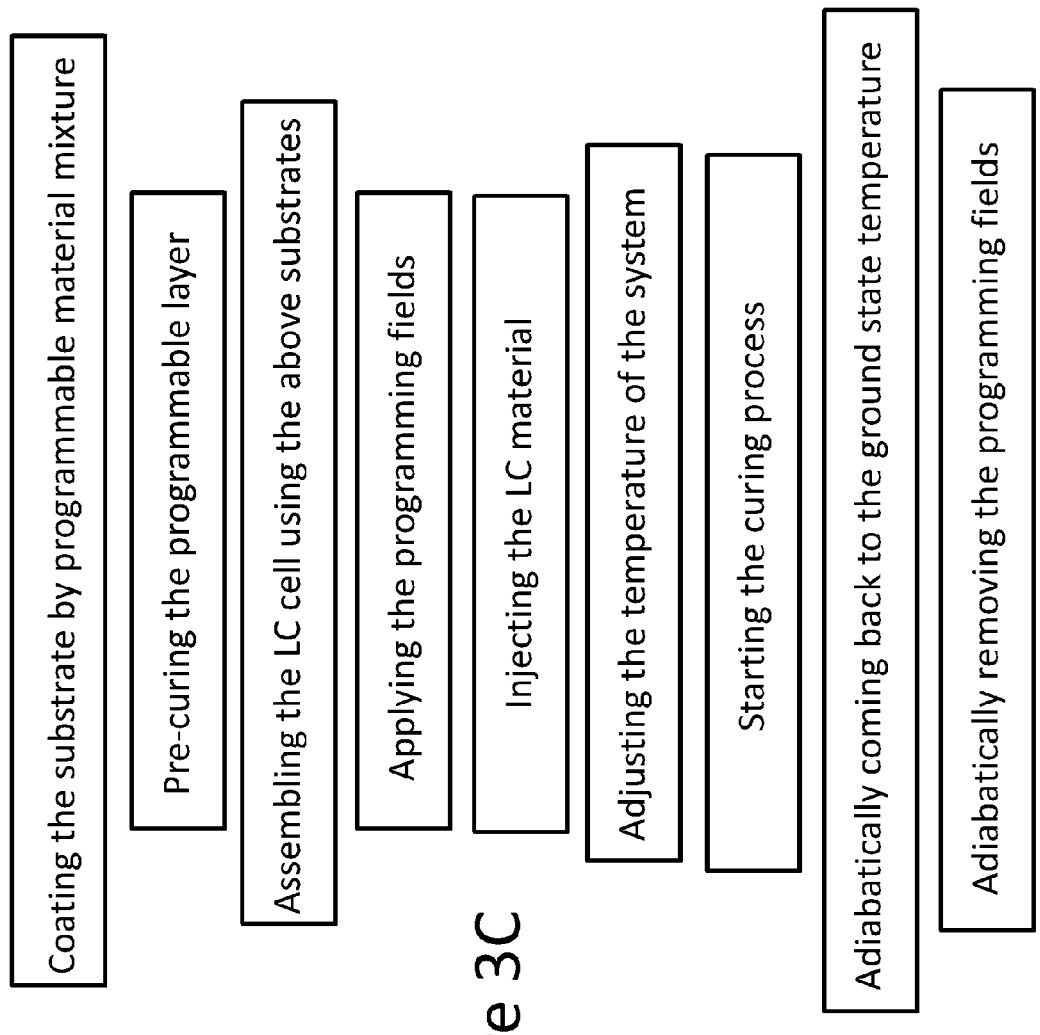
FIG. 3C illustrates the steps of a process for fabrication of an oriented LC cell with surface polymer stabilized (optionally inter diffused) liquid crystal according to one embodiment.

FIG. 3A schematically demonstrates the key principle of fabrication of an oriented LC cell (10) filled with surface polymer stabilized (optionally inter diffused) liquid crystal (11a). As shown in FIG. 3B, such a device has after its programming a programmed LC orientation in the ground state, namely without the typical electric field excitation.

The surface "programmable" layer (16) is preferably chosen out of materials which have good orientational correlation (before and after the polymerization) with LC molecules. Examples of such materials can be different types of poyimides as used for rubbed alignment layers, reactive mesogenes (11b), etc.

The cell (10) shown here has no built-in electrodes to enable the use of various types of excitation (including electrical) during the programming. The use of reactive mesogenes (11b) (polymerizable liquid crystals) can significantly increase the efficiency of the programming thanks to the strong orientational correlation of those molecules with the molecules of LC (11a). In one embodiment, the surface "programmable layer" (16) can be deposited on the surface of the cell substrate (12) by well known means in the industry, such as spin coating, dip coating, evaporation, etc. and preferably be partially cured (solidified) by heat, light or other type of exposure (19).

In one embodiment, the surface "programmable layer" can be deposited with a preferential direction directly on the cell substrate or on the top of a support layer that is already deposited on the cell substrate and processed adequately to provide adhesion and initial alignment of the "programmable layer", if necessary (depending upon the type of programming method).

In the example of FIG. 3A, the "programmable layer" (16) is first deposited on the cell substrate (12), preferably precured and used to build LC cells. The LC material is then injected into the cell (10) using vacuum, capillary, drop fill or other methods. The temperature of the system (the cell) is preferably maintained at a level that supports the strong interaction of the "programming layer" with the LC molecules. For example, in the case of using a reactive mesogene as programmable layer, this can be a temperature when both the reactive mesogene (11b) and LC (11a) are in the LC (e.g., nematic) phase. Then, a magnetic field H (18) is applied to align LC molecules. The applied external torque on preferably inter-diffused system of LC-programmable layer orients LC molecules (in the bulk and preferably near the surface) and the programmable layer material system along the desired direction α. Then, the final curing process of the programmable layer, namely the reactive mesogene molecules (11b) coating the programmable layer (16) is started by means of light, heat or other types of solidification methods.

Once the curing is ended, the obtained surface layer (16) maintains a certain pre-tilt angle $\alpha_0$, preferably as close as possible to the angle α used during programming or having a value defined by that angle, as shown in FIG. 3A.

Figure 1B:
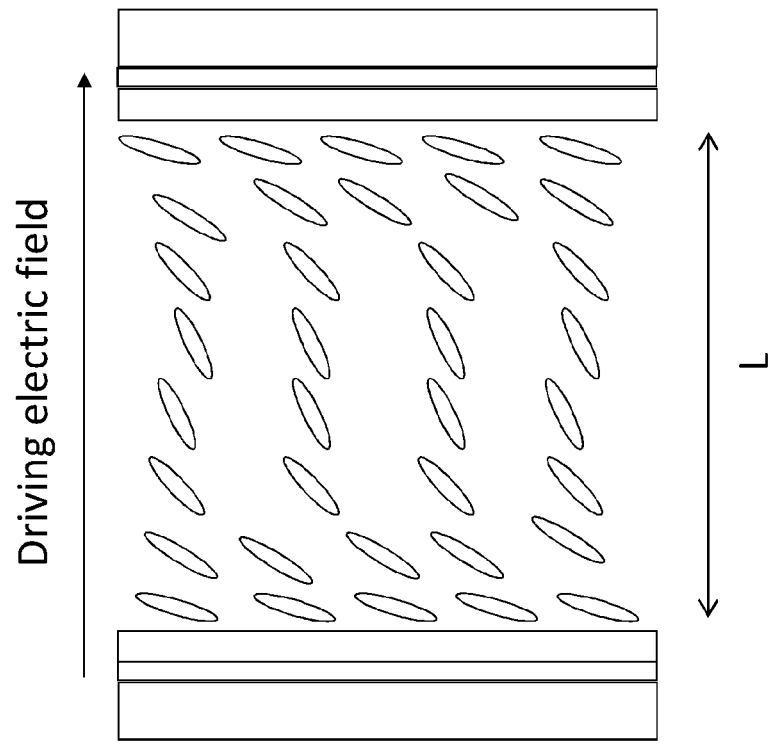
FIG. 1B shows schematically a side view of a conventional "uniformly" reoriented LC cell in the excited state (electric field induced torque is applied) in accordance with the prior art illustrating the variation of orientation of the molecules between the cell walls.
Figure 1A:
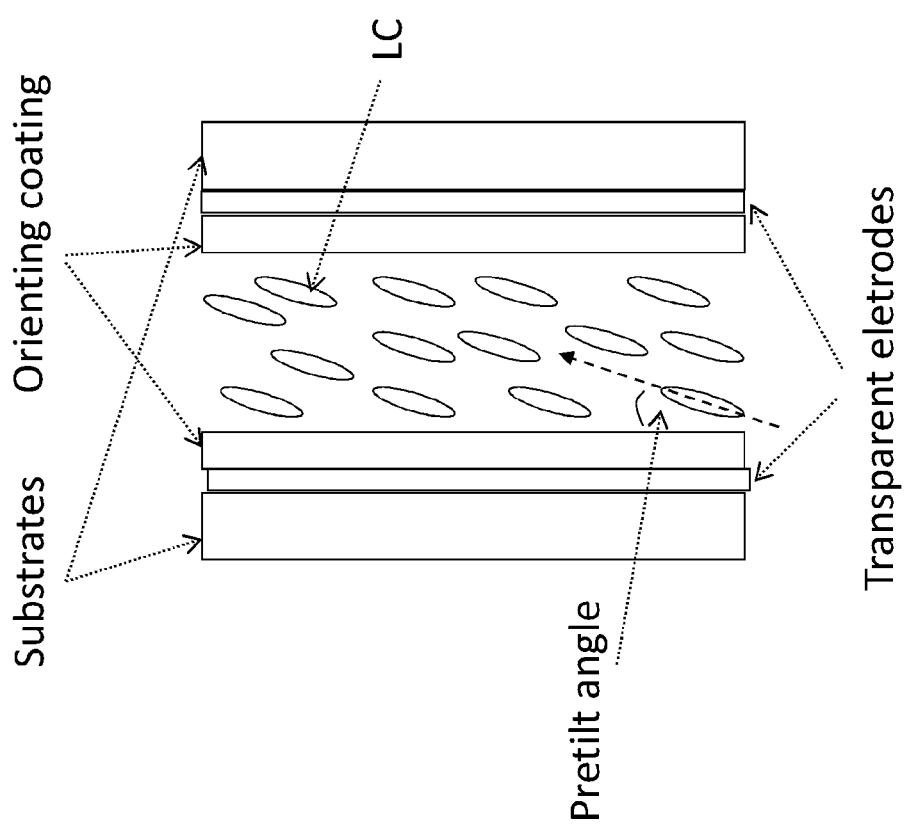
FIG. 1A shows schematically a side view of a conventional uniformly aligned LC cell in ground state (no excitation) in accordance with the prior art.
Figure 2:
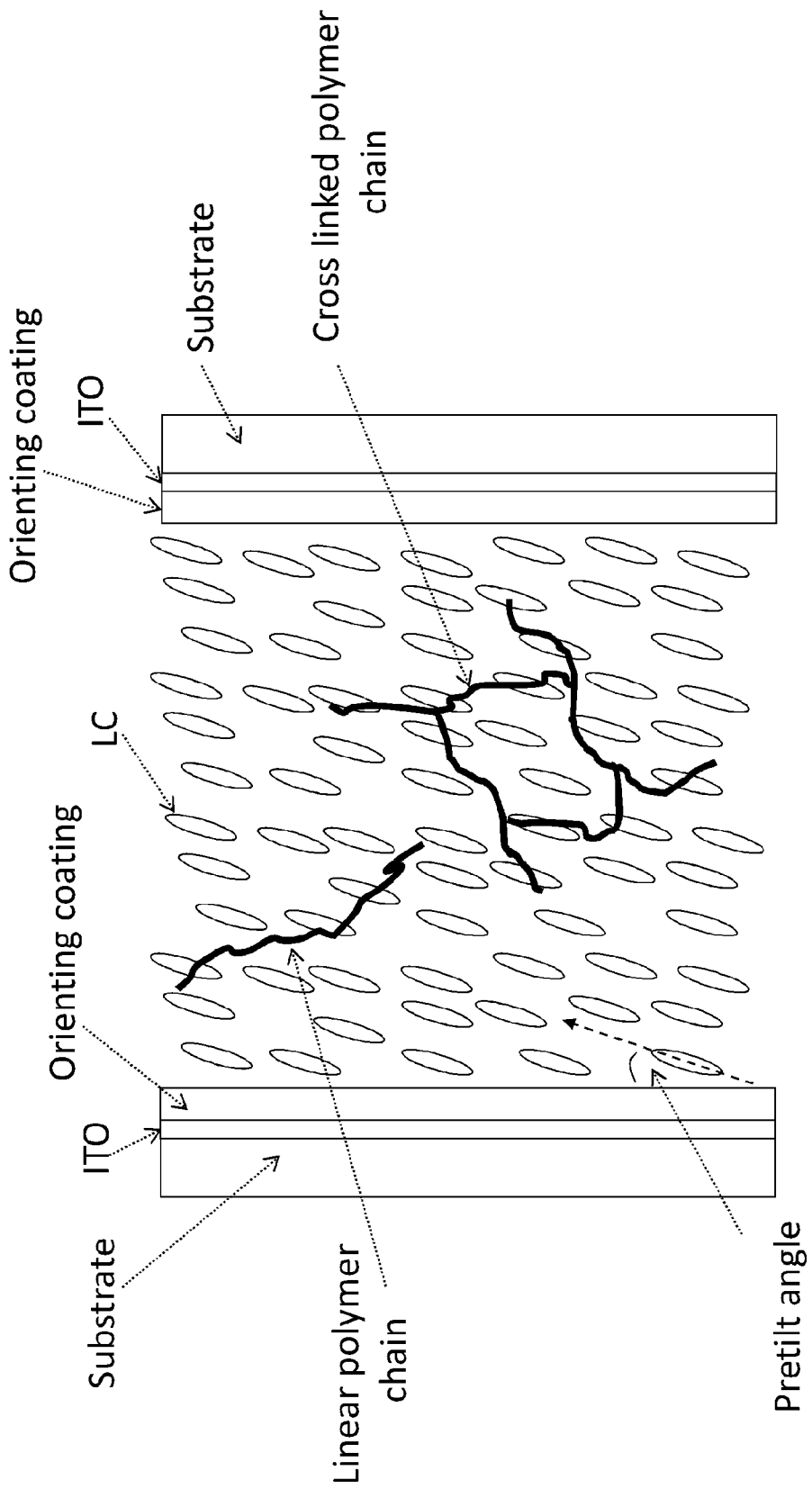
FIG. 2 is a schematic side view of a uniformly oriented LC cell filled with linear and/or cross linked volume dispersed polymer stabilized liquid crystal in the ground state (no excitation) forming a tunable lens in accordance with the prior art.

As can be appreciated, a pretilt angle of about 10 degrees reduces the electric field strength required to begin reorienting the LC in comparison with a conventional pretilt angle of 1 to 3 degrees. This can reduce power consumption in a display or other LC optical device, such as the device of FIG. 2.

Figure 4A:
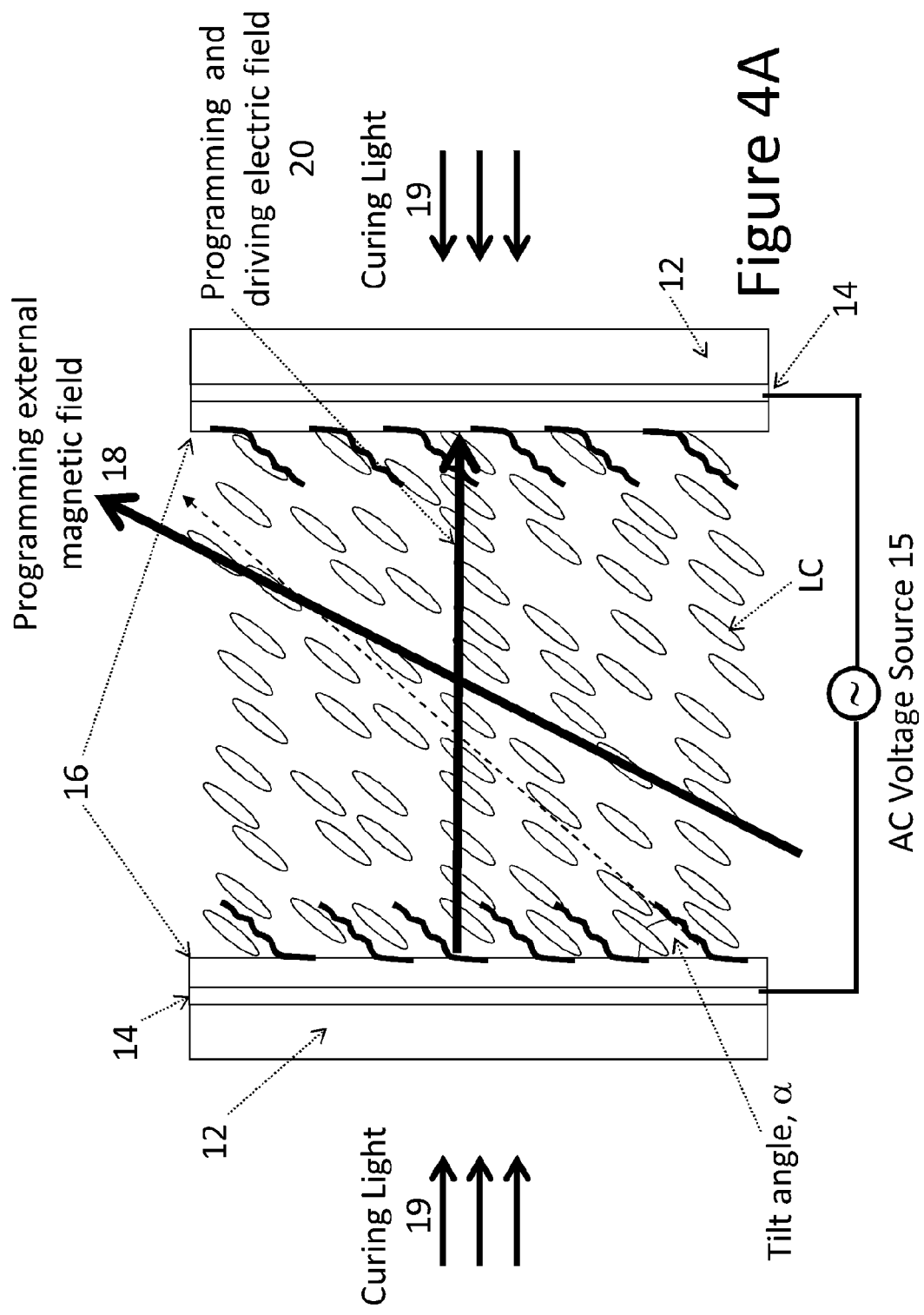
FIG. 4A illustrates a schematic side view of another embodiment in which the LC cell possesses transparent electrodes that are used to help form the programming electric field.
Figure 4B:
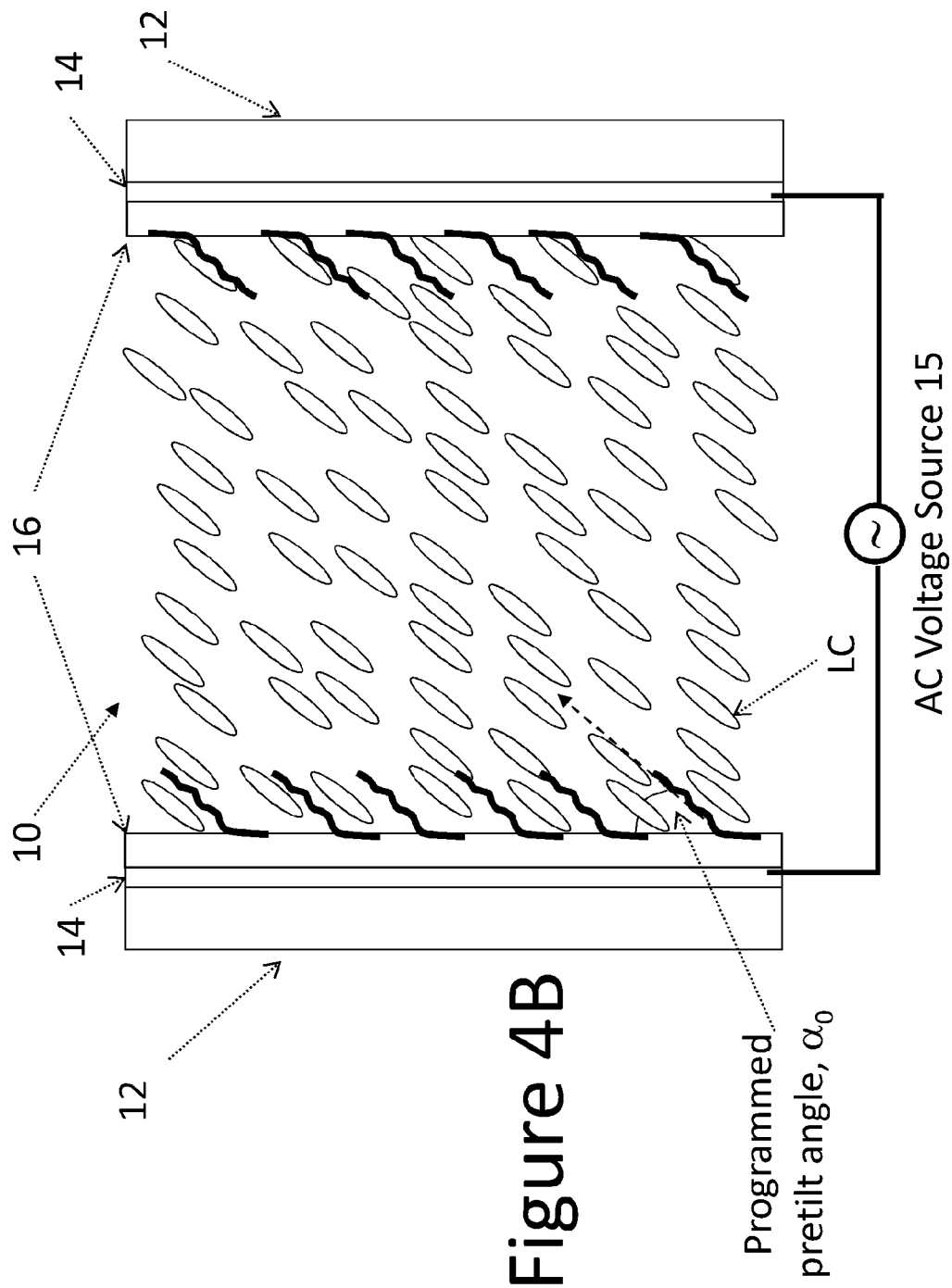
FIG. 4B is a schematic side view of the surface programmed LC cell with transparent electrodes in accordance with the embodiment of FIG. 4A.

In the embodiment of FIG. 4A the cell (10) comprises electrodes (14) that can be used to help program the layer (16) along with the magnetic field 18. However, additional external fields (such as magnetic or optical) may be used to achieve the desired pretilt angle with or without the use of the control field. The distance between the electrodes (14) being smaller than electrodes of an external programming field, the voltages required would be smaller compared to the pervious programming method (although the programming of the pretilt itself might be more efficient in the previous case). FIG. 4B illustrates the resulting cell (10) having the desired pre-tilt.

Note that the orientations and relative strengths of programming fields may be different depending upon the physical parameters of the LC and programming layer, for example, their dielectric or magnetic susceptibilities and their anisotropies. Thus, as it is well known in the art, the LC molecules would be aligned along the excitation field (for example, electric) if they possess positive anisotropy of corresponding susceptibilities (for example, $\Delta\epsilon=\epsilon_\parallel-\epsilon_\perp>0$) and, vice versa, their axis would be repulsed from the excitation field (e.g., electric), if that anisotropy is negative $\Delta\epsilon<0$. Clearly, in a scenario, where the driving electrode positions (and hence, the orientation of the driving electric field) are fixed, that would impose a corresponding choice of the LC. In the meantime, the fact that the second field (e.g., magnetic) is going to be used only for programming, then the anisotropy of the diamagnetic susceptibility of the LC $\Delta_{\chi LC}$ or of the programmable layer $\Delta_{\chi PL}$ would allow us wide choice of possible programming geometries.

In some embodiments, the foundation of the substrate (16) is a rubbed surface (e.g. polyimide) to give a conventional uniform low angle pretilt, while in other embodiments, the foundation is not ordered. In the case of an unordered foundation, the programming field (18) is used to set the direction of the molecules and thus set the order. In the case of an ordered foundation, the application of the programming field causes a deviation from that ground state orientation to achieve the desired pretilt. This can be easier to achieve since the ground state provided passively by the rubbed surface is very well ordered. The field strength to impart a deviation can be lower than would be required to order the molecules at the substrate (16) surface that are otherwise unordered.

It will also be appreciated that programming can be performed on a coating (16) in the absence of the cell's LC, on the coating (16) with the cell's LC present during programming, or on the coating (16) with LC present during programming with a change of LC prior to use of the cell (10). The programming field can act on the LC in the cell with the result that those molecules orient those at the surface (16), or it can act only on the molecules at the surface (16), or a combination of both.

Figure 5B:
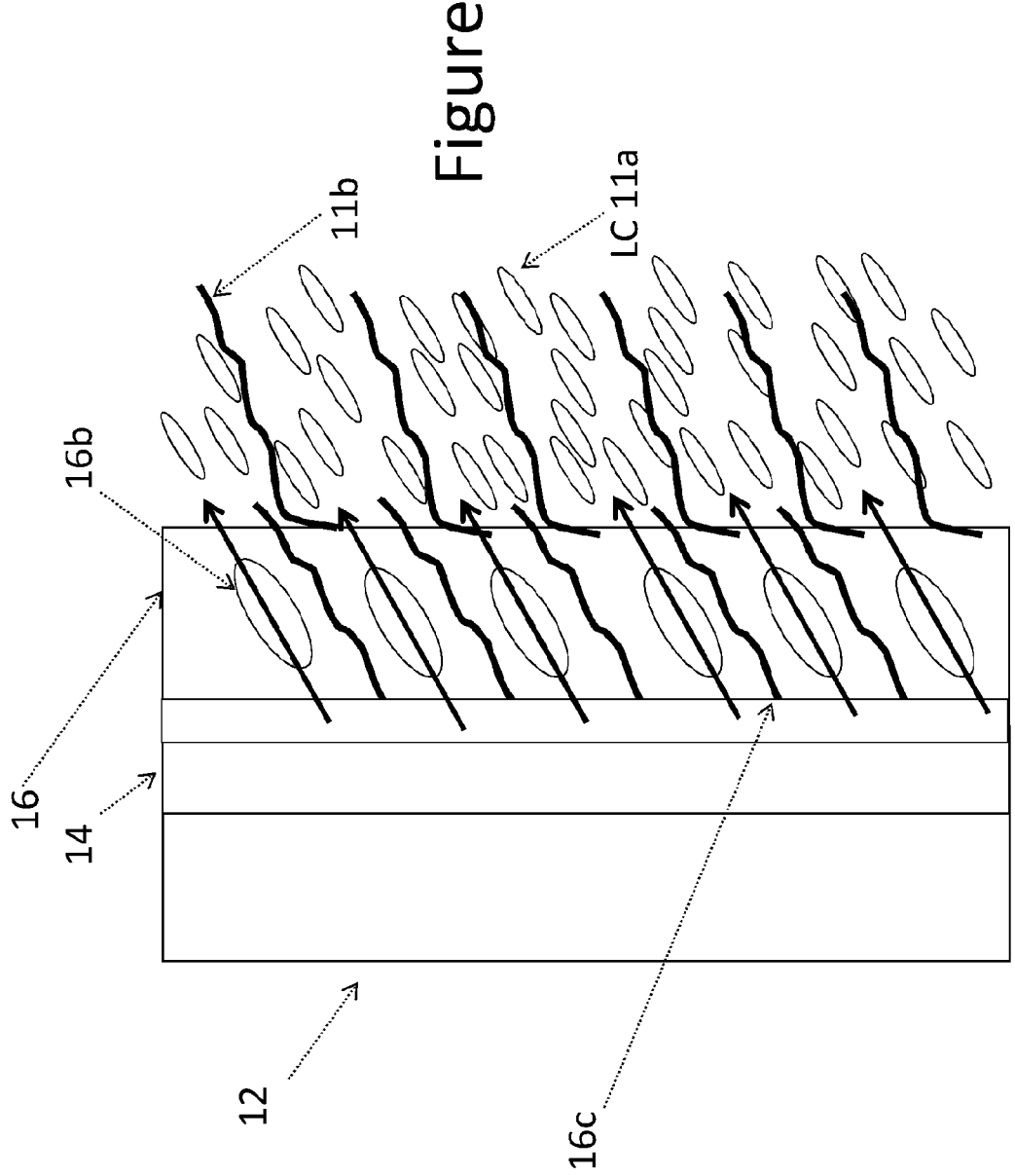
FIG. 5B illustrates schematically an enlarged side sectional view of the alignment surface area showing an enhancement of the programming efficiency by incorporation of "permanent field maintaining" anisotropic "guest" species, such as molecules, micro and nano particles and tubes (or planes) in the surface programmable ("host") layer that is optionally inter diffused with liquid crystal (already programmed state is shown).

The efficiency of "surface programming" can be improved by adding (into the "programmable layer") guest molecules (16a), micro- and nano-particles, tubes, planar and other, preferentially anisotropic, structures that can be oriented under the influence of programming fields and would preferably have strong orientational correlation with the molecules of the surface layer material as well as with molecules of LC, as shown in FIGS. 5A and 5B. I shall further refer to all types of surface layers (with or without guest elements) simply as "programmable layer". The role of the guests in FIG. 5A is the improvement of the programming of the layer itself, not necessarily introducing additional fields. The role of the guests (16b) in FIG. 5B is the improvement of the programming of the layer itself and, additionally, providing permanent magnetic and/or electric fields that propagates beyond the physical zone of the programmable layer to align the LC near the layer (16). Oriented chains (16c) can be included in the programmable layer, as shown, to improve efficiency.

Examples of guest particles (16a) with high dielectric anisotropy can be found in "Frequency modulation response of a liquid-crystal electro-optic device doped with nanoparticles" by Yukihide Shiraishi and Naoki Toshima, in Appl. Phys. Lett./Volume 81/Issue 15/NANOSCALE SCIENCE AND DESIGN, page 2845, 7 Oct. 2002.

Examples of guest particles with high diamagnetic anisotropy can be found in "Anisotropic magnetic susceptibility of multiwalled carbon nanotubes", by F. Tsui, L. Jin, and O. Zhou, Appl. Phys. Lett. 76, 1452 (2000), in "Ferromagnetism in fcc Twinned 2.4 nm Size Pd Nanoparticles", by B. Sampedro, P. Crespo, A. Hernando, R. Litrán, J. C. Sánchez López, C. López Cartes, A. Fernandez, J. Ramírez, J. González Calbet, and M. Vallet, Phys. Rev. Lett. 91, 237203 (2003), and in "Synthesis and magnetic properties of CoPt nanoparticles", by Xiangcheng Sun, Z. Y. Jia, Y. H. Huang, J. W. Harrell, and D. E. Nikles, J. Appl. Phys. 95, 6747 (2004).

In one embodiment FIG. 5C, I propose the use of thin initiator layer (16d) (thermal, photo or other type) that is deposited (by well known in the art methods of spin, dip or other types of coatings) on the surface of the substrate (16) to initiate the polymerization process near to that surface. The coating (16d) can be done directly on the substrate or a transparent electrode (14) or on an optional intermediate layer (16e) that could improve the alignment of LC molecules (11a), such a rubbed polyimide coating. In this case, reactive monomers/species (11b) (that have been described above to form the programmable layer) can be simply mixed or dispersed in the bulk of the LC. Then, the polymerization process would preferentially start near to the initiation layer (16d), near to the cell substrate. If the polymerization speed is of appropriate value, that would allow the diffusion of those monomers/species towards the surface of the LC cell and their "attachment" to the surface and the formation of preferably inter-diffused (with LC) programming layer. In this case, the reactive molecules (e.g. reactive mesogenes) can be doped in the LC volume. Then, the initiation of polymerization will create a decrease of monomer concentration near to the surface, which, in turn, will force the migration (diffusion) of reactive monomers of the volume to diffuse towards the surface and to "join" the surface polymerization process. The use of reactive mesogenes here can also be very useful since their diffusion will be already directional (in good angular correlation with LC molecules). The liquid crystal mixture can also contain inhibitors to minimize the volume polymerization, while the surface layer (16) contains initiators allowing the polymerization to take place near to the surface layer attaching the created network to surface layer.

In one embodiment of the present invention, the additional, programming enhancing species may be photo-alignable molecules, such as azobenzene molecules (an azo dye). This is illustrated in FIG. 6 in which molecules (16*f*) are within the programmable layer (16). As it is well known in the art [see Gibbons; Wayne M., Sun; Shao-Tang, Swetlin; Brian J. "Process of aligning and realigning liquid crystal media," U.S. Pat. No. 4,974,941, Dec. 4, 1990; Chigrinov; Vladimir G., Kozenkov; Vladimir M., Novoseletsky; Nicolic V., Reshetnyak; Victor Y., Reznikov; Yuriy A., Schadt; Martin, Schmitt; Klaus, "Process for making photopolymers having varying molecular orientation using light to orient and polymerize", U.S. Pat. No. 5,389,698, Feb. 14, 1995] the photo excitation of those molecules can bring to the reorientation of their lengthwise axis into the perpendicular (with respect to the electric field of light) orientation. In the particular case of circularly polarized light excitation, the molecular axes are reoriented in the direction of light propagation [see A. Yavrian, T. V. Galstian, M. Piché, Circularly polarized light induced rearrangement of optical axes in photoanisotropic recording media, Optical Engineering 41(04), 852-855, 2002]. Thus, linearly or circularly polarized light of the appropriate wavelength and propagation direction can be used to achieve a desired uniform or non uniform (with the help of light intensity distribution) orientation of those species. The above-described electric and magnetic fields, as well as material arrangements can be used to improve the alignment efficiency. The polymerization process of reactive species, that are present in the system, can then be started to maintain (at least partially) the obtained orientation. The influence of orientational programming would be higher, if there is a strong orientational correlation of those dyes with host molecules (of the programmable layer) and with molecules of LC.

Figure 5D:
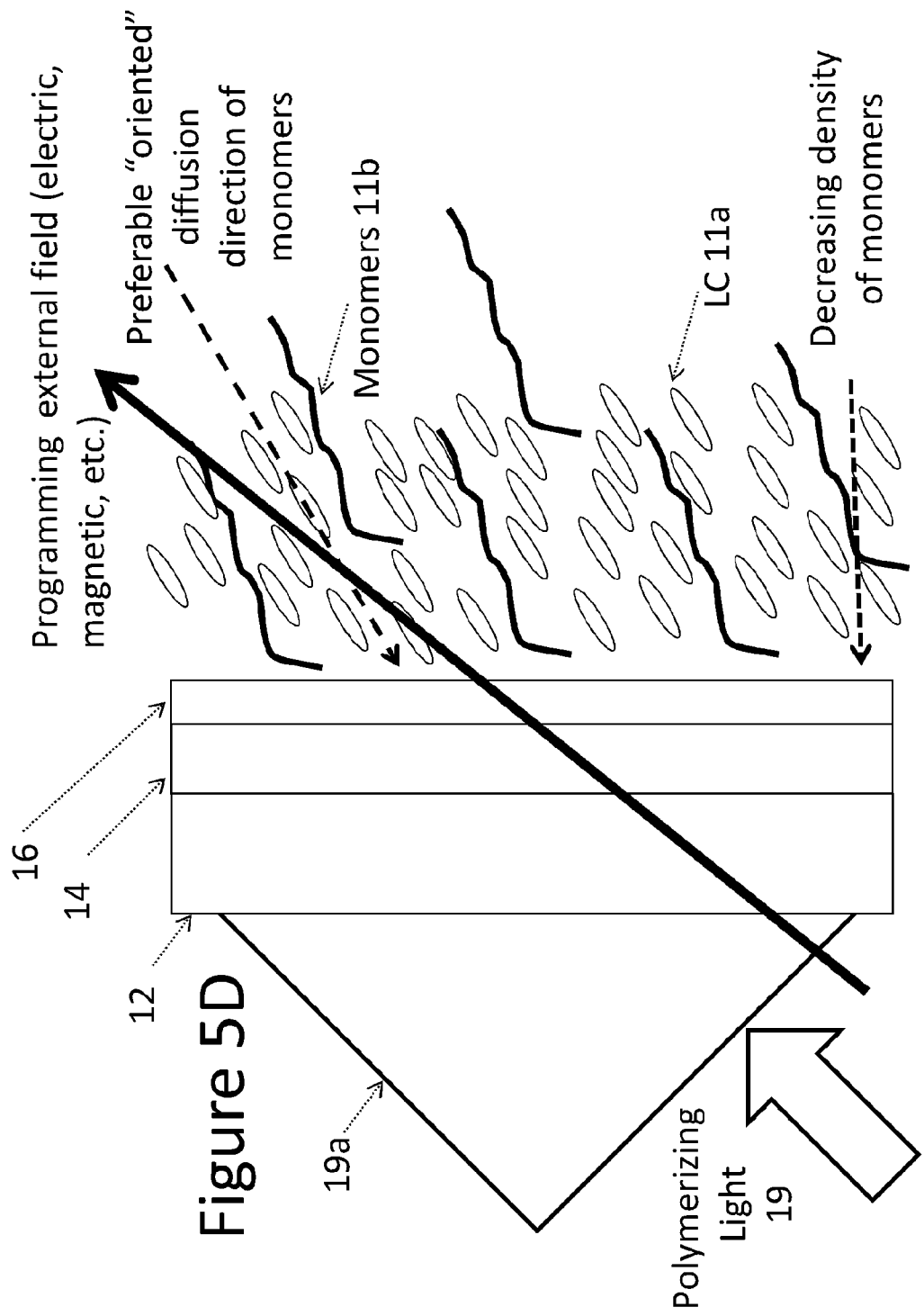
FIG. 5D is a view similar to FIG. 5C illustrating a similar, surface polymerization process, however without the surface layer of initiators, in which the polymerization initiation process is started by the evanescent field of light.

In FIG. 5D, there is shown a schematic illustration of a similar, surface polymerization process however without the surface layer of initiators. The polymerization initiation process here is started by the evanescent field of light. The diffusion and orientation concepts remain similar to the previous case of FIG. 5C. The curing light comprises a source (19) and optics (19*a*) to support the polymerizing light propagation and formation of the evanescent field.

In FIG. 6 there is shown a schematic demonstration of a geometry of surface programming using the combined effect of external field and light, in a programmable material system where the layer is doped by photo anisotropic materials (16*f*) (reorientable by the action of the polarization of light). This embodiment uses the inter diffusion of LC molecules (with the programmable material molecules) and the use of an additional external field. The inter diffusion of LC molecules (with the programmable material molecules) and the use of additional external field here is the key differentiator with previous embodiments.

Circularly polarized light has been demonstrated to be able to create a substantially 90° pretilt in a layer (16) that was formed by a spin coating of reactive mesogene monomers (11*b*) and azo-dye (16*f*) deposited on a rubbed polyimide foundation substrate. The circularly polarized light was shone in a direction perpendicular to substrate to orient the dye molecules vertically on the surface, thus directing the monomers in the same direction. These oriented monomers were then polymerized using UV light. On the same surface, the pretilt angle was near zero where the circularly polarized light was masked, thus demonstrating the effect of the exposure.

When light is used as the programming field, and in particular polarized light, it can be important to direct light onto the alignment layer being formed from above instead of through the substrate, since the substrate can create anisotropy in the light field.

For those, skilled in the art, it is easy to imagine a further broadening of the surface patterning and programming approach. For example, different oriented layers may be deposited and then additionally treated by light, point or ring electrodes to create similar spatially non uniform alignment layers and tunable devices.

The invention claimed is:

1. A liquid crystal cell comprising:
a control field source; and
a pair of cell walls defining a cavity, the cavity being filled for operation with nematic liquid crystal molecules, at least one of the cell walls having an alignment layer including a rubbed foundation layer and an ordered surface layer that interacts with the liquid crystal molecules to cause alignment of the liquid crystal molecules in a zero field ground state in a predetermined essentially uniform pre-tilt director orientation between 7° and 30°, the control field source being configured to cause a change in orientation of said liquid crystal molecules from said ground state to change optical properties of said cell;
wherein the ordered surface layer is formed, over said foundation layer having a pre-tilt angle between 1° and 6°, with alignment liquid crystal molecules aligned using an external programming field at an orientation between 7° and 30° without mechanical rubbing, said external programming field being at least one of an electric, magnetic and acoustic field.

2. The cell as defined in claim 1, wherein said ordered surface layer is programmed while in contact with liquid crystal molecules, said programming field being used to align said liquid crystal molecules that in turn cause alignment of molecules of said ordered surface layer prior to curing.

3. The cell as defined in claim 2, wherein said ordered surface layer is programmed while in contact with said liquid crystal molecules in said cell.

4. The cell walls as defined in claim 1, wherein said surface layer contains particles or surface molecules which provide angular correlation with said liquid crystal molecules.

5. The cell walls as defined in claim 1, wherein said surface material of the cell wall preferably allows a partial interdiffusion with said liquid crystal molecules prior to curing.

6. The cell as defined in claim 1, wherein said ordered surface layer comprises polymer molecules subjected to polymerization after being aligned using said programming field.

7. The cell as defined in claim 1, wherein said ordered surface layer comprises molecules subjected to solidification after being aligned using said programming field while in an orientationally and spatially mobile state.

8. The cell as defined in claim 1, wherein said surface layer contains surface molecules or particles which may be oriented prior to the injection of said liquid crystal molecules.

9. The cell as defined in claim 1, wherein said surface layer contains surface molecules or particles which may be oriented and fixed prior to the injection of said liquid crystal molecules.

10. The cell as defined in claim 8, wherein said particles have anisotropic magnetic properties.

11. The cell as defined in claim 2, wherein at least one additive is added to said liquid crystal molecules to enhance an efficiency of said field programming and/or stabilizing.

12. The cell as defined in claim 8, wherein said surface molecules are photo-alignable molecules dispersed in said surface layer.

13. The cell as defined in claim 1, wherein said programming field is electric.

14. The cell as defined in claim 1, wherein said control field is electric, thermal or magnetic.

15. The cell as defined in claim 1, wherein said liquid crystal mixture contains particles or molecules that may be aligned by means of said control field source prior of programming the said surface layer.

16. The cell as defined in claim 1, wherein said liquid crystal mixture contains molecules that may be polymerized and attached to the said surface layer after being reoriented by the said control field source.

17. The cell as defined in claim 16, wherein said liquid crystal mixture contains inhibitors to minimize the volume polymerization while said surface layer contains initiators allowing the polymerization to take place near to the surface layer attaching the created network to said surface layer.

18. The cell as defined in claim 1, wherein said cell walls are free of a rubbed substrate layer.

19. The cell as defined in claim 1, wherein said cell is a spatial light modulator.

20. A method of manufacturing a liquid crystal cell, comprising:

using an external programming field to form, over a rubbed foundation layer having a pre-tilt angle between 1° and 6°, an ordered surface layer with aligned molecules on at least one wall of a cavity of said cell, wherein said aligned molecules of said ordered surface layer are ordered and stabilized using an external programming field at an orientation between 7° and 30° without mechanical rubbing and when in contact with liquid crystal molecules of said cell cause alignment of the liquid crystal molecules in a zero control field ground state in a predetermined essentially uniform pre-tilt director orientation between 7° and 30°, said programming field being at least one of an electric, magnetic and acoustic field.

21. The method as defined in claim 20, wherein said aligned molecules are cured, said alignment of the liquid crystal molecules in said zero control field ground state being different from an alignment of said aligned molecules prior to curing.

22. The cell as defined in claim 1, wherein said ordered surface layer causes zero-field ground state alignment of the liquid crystal molecules at a predetermined essentially uniform pre-tilt director orientation between 8° and 16°, preferably 10°.

* * * * *